US008487181B2

(12) United States Patent
Lapp

(10) Patent No.: US 8,487,181 B2
(45) Date of Patent: Jul. 16, 2013

(54) CABLE WITH EMBEDDED INFORMATION CARRIER UNIT

(75) Inventor: Siegbert Lapp, Stuttgart (DE)

(73) Assignee: Lapp Engineering & Co., Cham (CH)

( * ) Notice: Subject to any disclaimer, the term of this patent is extended or adjusted under 35 U.S.C. 154(b) by 324 days.

(21) Appl. No.: 12/590,842

(22) Filed: Nov. 13, 2009

(65) Prior Publication Data

US 2010/0147583 A1 Jun. 17, 2010

Related U.S. Application Data

(63) Continuation of application No. PCT/EP2008/055511, filed on May 5, 2008.

(30) Foreign Application Priority Data

May 15, 2007 (DE) ........................ 10 2007 024 212

(51) Int. Cl.
*H02G 3/00* (2006.01)
*H02G 9/00* (2006.01)

(52) U.S. Cl.
USPC ........................................................ 174/70 R

(58) Field of Classification Search
USPC ........................................................ 174/70 R
See application file for complete search history.

(56) References Cited

U.S. PATENT DOCUMENTS

| | | | | |
|---|---|---|---|---|
| 4,751,614 | A | 6/1988 | Mehnert | |
| 4,880,484 | A | 11/1989 | Obermeier et al. | |
| 5,045,368 | A * | 9/1991 | Cosman et al. | 428/34.1 |
| 5,106,175 | A * | 4/1992 | Davis et al. | 385/100 |
| 5,305,410 | A | 4/1994 | Arroyo | |
| 5,532,598 | A | 7/1996 | Clark, Jr. et al. | |
| 5,541,803 | A | 7/1996 | Pope, Jr. et al. | |
| 5,577,147 | A | 11/1996 | Arroyo et al. | |
| 5,578,926 | A | 11/1996 | Reinhardt | |
| 5,729,966 | A | 3/1998 | Grulick | |
| 5,808,779 | A | 9/1998 | Weis | |
| 5,892,430 | A * | 4/1999 | Wiesman et al. | 340/538.16 |
| 5,902,251 | A | 5/1999 | vanHooydonk | |
| 5,986,207 | A | 11/1999 | Uhlenhuth | |
| 6,172,608 | B1 * | 1/2001 | Cole | 340/572.1 |
| 6,246,328 | B1 * | 6/2001 | Parkinson et al. | 340/572.1 |
| 6,388,575 | B1 * | 5/2002 | Galloway | 340/572.1 |
| 6,563,094 | B2 | 5/2003 | Kochman et al. | |
| 6,791,454 | B2 * | 9/2004 | Mangold et al. | 340/870.16 |

(Continued)

FOREIGN PATENT DOCUMENTS

| | | |
|---|---|---|
| CA | 2 581 186 | 5/2006 |
| DE | 17 65 765 | 8/1971 |

(Continued)

*Primary Examiner* — Timothy Thompson
*Assistant Examiner* — Nathan Milakovich
(74) *Attorney, Agent, or Firm* — Lipsitz & McAllister, LLC

(57) ABSTRACT

In order to improve a cable, comprising an inner cable body, in which electrical conductor strands run in the longitudinal direction of the cable, a cable sheath, enclosing the inner cable body and lying between an outer surface of the cable and the inner cable body, and at least one information carrier unit, disposed within the outer surface of the cable, to increase the range of communication between the information carrier unit and the read/write device, it is proposed to provide the information carrier unit having an antenna unit, which can be coupled with a read/write device by parasitic electromagnetic fields between the antenna unit and at least two of the electrical conductor strands of the inner cable body.

18 Claims, 13 Drawing Sheets

U.S. PATENT DOCUMENTS

| | | | | |
|---|---|---|---|---|
| 6,897,822 | B2 * | 5/2005 | Sparks et al. | 343/767 |
| 6,915,050 | B2 * | 7/2005 | Koyasu et al. | 385/105 |
| 6,973,243 | B2 * | 12/2005 | Koyasu et al. | 385/100 |
| 7,041,906 | B2 | 5/2006 | John | |
| 7,046,146 | B2 * | 5/2006 | Wuidart et al. | 340/572.1 |
| 7,158,012 | B2 * | 1/2007 | Wiesman et al. | 340/538.16 |
| 7,170,405 | B2 * | 1/2007 | Daum et al. | 340/538.11 |
| 7,201,221 | B2 | 4/2007 | Tubel et al. | |
| 7,223,962 | B2 | 5/2007 | Fageraas et al. | |
| 7,265,533 | B2 * | 9/2007 | Lightbody et al. | 324/126 |
| 7,313,304 | B2 | 12/2007 | Andrews et al. | |
| 7,526,163 | B2 | 4/2009 | Freeland et al. | |
| 7,526,582 | B2 | 4/2009 | Best et al. | |
| 7,539,379 | B2 | 5/2009 | Khoshaba et al. | |
| 7,552,872 | B2 | 6/2009 | Tokita et al. | |
| 7,618,291 | B2 | 11/2009 | Standke | |
| 7,856,185 | B2 | 12/2010 | Hudgins et al. | |
| 7,940,182 | B2 | 5/2011 | Lange et al. | |
| 8,023,786 | B2 * | 9/2011 | Lapp | 385/101 |
| 2002/0034365 | A1 | 3/2002 | Vogelsang | |
| 2002/0061727 | A1 | 5/2002 | Mangold et al. | |
| 2004/0149488 | A1 | 8/2004 | John | |
| 2004/0156601 | A1 | 8/2004 | Koyasu et al. | |
| 2004/0184747 | A1 | 9/2004 | Koyasu et al. | |
| 2005/0083203 | A1 | 4/2005 | Surkau | |
| 2005/0129088 | A1 | 6/2005 | Rajendran et al. | |
| 2005/0140512 | A1 | 6/2005 | Sakama et al. | |
| 2006/0012482 | A1 * | 1/2006 | Zalud et al. | 340/572.7 |
| 2006/0214801 | A1 | 9/2006 | Murofushi et al. | |
| 2007/0146230 | A1 * | 6/2007 | Overhultz et al. | 343/895 |
| 2008/0204235 | A1 * | 8/2008 | Cook | 340/572.1 |
| 2008/0218355 | A1 | 9/2008 | Downie et al. | |
| 2008/0318477 | A1 | 12/2008 | Standke | |
| 2009/0001930 | A1 * | 1/2009 | Pohjonen | 320/108 |
| 2009/0146898 | A1 * | 6/2009 | Akiho et al. | 343/787 |
| 2009/0156042 | A1 | 6/2009 | Radenne et al. | |
| 2010/0109670 | A1 * | 5/2010 | Arnaud et al. | 324/326 |
| 2010/0165557 | A1 * | 7/2010 | Lapp | 361/679.01 |

FOREIGN PATENT DOCUMENTS

| | | | |
|---|---|---|---|
| DE | 36 20 595 | | 2/1987 |
| DE | 37 43 470 | | 3/1989 |
| DE | 43 33 121 | | 5/1994 |
| DE | 690 09 113 | | 11/1994 |
| DE | 690 14 521 | | 6/1995 |
| DE | 690 16 035 | | 6/1995 |
| DE | 196 01 651 | | 7/1997 |
| DE | 196 39 902 | | 12/1997 |
| DE | 197 02 536 | | 7/1998 |
| DE | 198 14 540 | | 10/1999 |
| DE | 299 21 017 | | 5/2000 |
| DE | 695 16 138 | | 12/2000 |
| DE | 199 55 120 | | 5/2001 |
| DE | 101 11 371 | | 9/2002 |
| DE | 101 44 552 | | 2/2004 |
| DE | 20 2004 017 158 | | 2/2005 |
| DE | 10 2004 051 594 | | 5/2006 |
| DE | 10 2005 006 318 | | 8/2006 |
| DE | 20 2005 006 373 | | 8/2006 |
| DE | 10 2005 044 918 | | 2/2007 |
| DE | 10 2005 044 482 | | 4/2007 |
| DE | 10 2005 058 385 | | 6/2007 |
| DE | 10 2006 036 719 | | 2/2008 |
| DE | 10 2006 036 723 | | 2/2008 |
| EP | 0 419 637 | | 4/1991 |
| EP | 0 408 320 | | 6/1991 |
| EP | 1 191 354 | | 3/2002 |
| EP | 1 220 236 | | 7/2002 |
| EP | 1 424 882 | | 6/2004 |
| EP | 1 548 639 | | 6/2005 |
| EP | 1 772 657 | | 4/2007 |
| EP | 1 881 811 | | 2/2008 |
| EP | 1 884 811 | | 2/2008 |
| FR | 2 830 941 | | 4/2003 |
| JP | 2003203527 | | 7/2003 |
| JP | 2005184424 | A * | 7/2005 |
| WO | 90/10879 | | 9/1990 |
| WO | 91/04503 | | 4/1991 |
| WO | 95/32439 | | 11/1995 |
| WO | 03/067512 | | 8/2003 |
| WO | 03/091665 | | 11/2003 |
| WO | 2004/072988 | | 8/2004 |
| WO | WO 2006/063023 | | 6/2006 |
| WO | WO 2007/016956 | | 2/2007 |
| WO | WO 2007/036346 | | 4/2007 |

* cited by examiner

CABLE WITH EMBEDDED INFORMATION CARRIER UNIT

This application is a continuation of International application No. PCT/EP2008/055511 filed on May 5, 2008.

This patent application claims the benefit of International application No. PCT/EP2008/055511 of May 5, 2008 and German application No. 10 2007 024 212.5 of May 15, 2007, the teachings and disclosure of which are hereby incorporated in their entirety by reference thereto.

BACKGROUND OF THE INVENTION

The invention relates to a cable, comprising an inner cable body, in which electrical conductor strands run in the longitudinal direction of the cable, a cable sheath, enclosing the inner cable body and lying between an outer surface of the cable and the inner cable body, and at least one information carrier unit, disposed within the outer surface of the cable.

Cables of this kind are known from the prior art. In the case of these cables, the information carrier unit is provided for storing items of information which can be read out by a read/write device. In the case of the known solutions, however, there is the problem that the read/write device must be positioned close to the information carrier unit in order to read out information on the information carrier unit or to write to the latter again.

It is therefore an object of the invention to increase the range of communication between the information carrier unit and the read/write device.

SUMMARY OF THE INVENTION

This object is achieved according to the invention in the case of a cable of the type described at the beginning by the information carrier unit having an antenna unit, which can be coupled with a read/write device by parasitic electromagnetic fields between the antenna unit and at least two of the electrical conductor strands of the inner cable body.

The advantage of the solution according to the invention can be seen in that, by the parasitic electromagnetic field coupling with at least two conductor strands of the inner cable body, an effective antenna range that is much greater than the antenna range of the antenna unit in insulated surroundings can be obtained, in particular in the longitudinal direction of the cable.

There is consequently the possibility of establishing communication between the read/write device and the information carrier unit over much greater ranges.

The coupling between the antenna unit of the information carrier unit and the read/write device can be set up particularly advantageously if, when excited by the read/write device, the at least two electrical conductor strands of the inner cable body build up and emit the parasitic electromagnetic field in a frequency range predetermined by the antenna unit of the information carrier unit, the excitation by the read/write device taking place likewise in particular in the frequency range predetermined by the antenna unit of the information carrier unit, in which range the antenna unit of the information carrier unit usually operates resonantly, in order to create optimum receiving and transmitting conditions on the part of the antenna unit of the information carrier unit. In particular, this also involves the frequency range of the antenna unit of the read/write device substantially coinciding with the frequency range of the antenna unit of the information carrier unit.

In order to obtain a parasitic emission of the at least two electrical conductor strands, it is preferably provided that the at least two electrical conductor strands interact non-resonantly in the frequency range of the electromagnetic field, so that reception and emission on the part of the electrical conductor strands are possible.

It is preferably provided in this respect that the at least two electrical conductor strands behave in the manner of a dipole and the antenna unit can be coupled with the electrical conductor strands by the parasitic electromagnetic fields thereby forming.

The at least two electrical conductor strands can be used for producing a parasitic electromagnetic field particularly advantageously if the at least two electrical conductor strands of the inner cable body are galvanically isolated from one another, so that they do not act as a coil, but can behave in the manner of a dipole.

With regard to the run of the at least two electrical conductor strands in the inner cable body, no further details have been specified so far. An advantageous solution provides that the at least two electrical conductor strands run substantially with a constant spacing from one another in the inner cable body.

It is still more advantageous if the at least two electrical conductor strands run substantially parallel to one another.

In connection with the solution so far, consideration has only been given to there being at least two electrical conductor strands, building up a parasitic electromagnetic field.

However, it is particularly advantageous if the at least two electrical conductor strands are twisted with at least one further optical and/or electrical conductor strand or a number of further optical and/or electrical conductor strands, so that a cable of this kind can be used conventionally in its entirety.

In this respect, the at least two electrical conductor strands which are used for building up a parasitic electromagnetic field may be provided such that they are fully insulated in the inner cable body and not used for a customary cable function.

However, there is also the possibility of transmitting signals or power over the at least two electrical conductor strands, without thereby disturbing the buildup of a parasitic electrical field, since this lies in a frequency range which does not interfere with customary use of the electrical conductor strands in the cable.

For the interaction with a parasitic electromagnetic field of this kind, built up by the at least two electrical conductor strands, it is convenient if the antenna unit of the information carrier unit is formed as a dipole antenna with a dipole radiation direction.

A dipole antenna of this kind may in this case be aligned in various ways in the cable.

One exemplary embodiment provides that one component of the dipole radiation direction runs transversely to the longitudinal direction of the cable.

Another solution provides that one component of the dipole radiation direction runs approximately parallel to the longitudinal direction of the cable.

A further, particularly advantageous coupling to the at least two electrical conductors of the cable is obtained if one component of the dipole radiation direction runs transversely to a twisting direction of the conductor strands in the inner cable body, since optimum interaction between the dipole antenna and the at least two electrical conductor strands is possible as a result, in order to be able to interact optimally with the parasitic electromagnetic field.

In the case of a rod-like dipole extending substantially in a longitudinal direction, the dipole radiation directions run radially to the longitudinal direction and, in the case of a dipole folded in a plane, they run primarily perpendicularly to the plane.

With regard to the position of the antenna unit of the information carrier unit in the cable itself, no further details have been specified so far. A particularly advantageous solution thus provides that the antenna unit in the cable lies closer to the inner cable body than to the outer surface of the cable, in order to make the interaction with the at least two electrical conductor strands as intensive as possible.

In the case of highly flexible electrical cables, a separating layer is usually provided between the inner cable body and the outer sheath of the cable. In a case of this kind, it is preferably provided that the antenna unit is disposed on the separating layer between the inner cable body and the outer sheath of the cable, in order to be easily able to introduce the antenna unit before the outer sheath of the cable is extruded-on.

For example, it would be conceivable in this respect to fix the antenna unit, in particular with the information carrier unit, to the separating layer before applying the separating layer, and consequently to apply the antenna unit at the same time as the separating layer is applied, the outer sheath of the cable then being extruded onto the separating layer at a later time.

In order in the case of a highly flexible cable not to disturb the geometrical and physical conditions with respect to the flexibility in the cable by the introduction of the antenna unit and the information carrier unit, it is preferably provided that the antenna unit is disposed on a side of the separating layer that is facing away from the inner cable body. This avoids disturbances of the friction between the separating layer and the inner cable body which occur when the highly flexible cable is bent, in particular is stressed in multiple bending cycles.

In principle, it would be conceivable in this respect to embed the antenna unit in the separating layer.

However, it is far easier if the antenna unit is embedded in the cable sheath.

Within the scope of the solution according to the invention discussed so far, consideration has primarily been given to improving the communication between the read/write device and the antenna unit in the cable.

As an alternative or in addition, an advantageous exemplary embodiment provides for this purpose that a multiplicity of information carrier units are disposed in the longitudinal direction of the cable, the information carrier units being disposed at a distance from one another and each of these information carrier units having an antenna unit.

In this case, the information carrier units could be disposed at randomly varying distances from one another in the longitudinal direction of the cable.

In order to optimize the communication with the information carrier units, and in particular their position in relation to one another for the communication, it is preferably provided that the multiplicity of information carrier units are disposed at defined regular intervals in the longitudinal direction of the cable.

Defined regular intervals of this nature make it much easier when finding one information carrier unit also to locate the other information carrier units respectively in the longitudinal direction of the cable.

It is particularly advantageous in this respect if the defined regular intervals for the information carrier units specify a uniform spacing between the information carrier units in the longitudinal direction of the cable, so that by finding one information carrier unit, the other information carrier units can also be definitively located.

The information carrier units disposed at a distance from one another in the longitudinal direction of the cable may in principle be operated in complete isolation from one another, so that each individual information carrier unit must be addressed by the read/write device, without the other information carrier units being in question.

However, a particularly advantageous solution provides that the antenna unit of one of the information carrier units can be coupled with the antenna unit of another of the information carrier units by electromagnetic field coupling. In this case there is, for example, the possibility of further transmitting information from at least one of the information carrier units to the other of the information carrier units, if appropriate even likewise to further information carrier units, by the information being passed on from information carrier unit to information carrier unit.

An information transmission of this kind is for example easily possible if antenna units of the information carrier units respectively following one another in the longitudinal direction of the cable can be coupled with one another.

The coupling of the antenna units could primarily take place by the antenna units being disposed in relation to one another at the distance of the customary antenna range, when the range of the antenna is not influenced by the region surrounding it. However, since the antenna ranges are not very great, this has the disadvantage that the information carrier units would have to be disposed at a smaller distance from one another.

It is particularly suitable, however, if the antenna units of the information carrier units can be coupled by way of parasitic electromagnetic field coupling by way of the at least two electrical conductor strands of the inner cable body. Parasitic electromagnetic field coupling of this kind allows an effective antenna range to be obtained that is much greater than the antenna range in the uninfluenced state.

It is particularly advantageous in this respect if, by the parasitic electromagnetic field coupling between the antenna unit and the at least two conductor strands, an effective antenna range of the antenna unit that is increased by a factor of more than two in comparison with an antenna range of the antenna unit that is uninfluenced by the surroundings, can be obtained in the longitudinal direction of the cable.

It is particularly advantageous in this respect if the effective antenna range is increased by a factor of more than five, still better a factor of more than ten, in comparison with the uninfluenced antenna range.

In the case in which the individual antenna units in a cable according to the invention are to be operated in isolation and without interaction with one another, it is advantageously provided, however, that the information carrier units are disposed at the defined regular intervals in relation to one another in such a way that the distances between the information carrier units correspond to at least 2 times an effective antenna range of the information carrier units in the direction of the respectively nearest information carrier units.

In particular, this also has the effect, when the information carrier units are addressed by the read device, of avoiding multiple reading out by multiple information carrier units, and consequently misinterpretation of the data read out.

It is still better if the distances correspond to at least 2.5 times the effective antenna range of the information carrier units in the direction of the nearest information carrier unit.

With regard to the excitation of the at least two electrical conductor strands in the inner cable body to build up the parasitic electromagnetic field, no further details have been specified so far.

An advantageous solution thus provides that the excitation of the at least two electrical conductor strands takes place by electromagnetic field coupling with an antenna unit of the read/write device. That is to say that the read/write device excites the at least two electrical conductor strands with its antenna unit by way of an electromagnetic field coupling in such a way that said conductor strands build up the parasitic electromagnetic field for the interaction with the antenna unit of the information carrier unit.

An electromagnetic field coupling of this kind between the antenna unit of the read/write device and the two electrical conductors preferably takes place through the cable sheath.

In the case of an electromagnetic field coupling of this kind between the antenna unit of the read/write device and the at least two electrical conductor strands, there is the possibility that the parasitic electromagnetic field coupling between the at least two electrical conductor strands and the antenna unit of the information carrier unit takes place with the antenna unit of the read/write device disposed outside an antenna range of the antenna unit of the information carrier unit that is uninfluenced by the surroundings.

Alternatively, however, there is also the possibility of achieving the excitation of the at least two electrical conductor strands not by way of an electromagnetic field coupling but by the excitation of the at least two electrical conductor strands taking place galvanically from the read/write device.

A galvanic coupling of this kind of the read/write device with the at least two electrical conductor strands preferably takes place by the at least two electrical conductor strands being able to be connected galvanically to the read/write device, at the end of the cable.

With regard to the forming of the information carrier unit itself, no further details have been specified so far.

An advantageous embodiment provides that the information carrier unit comprises a base.

In this case, it is provided that an integrated circuit of the information carrier unit is disposed on the base.

Furthermore, it is suitably provided in this case that a conductor acting as an antenna unit is disposed on the base.

The antenna may in this case be produced from conductor tracks, produced by a lacquer applied to the base. Particularly advantageous is an embodiment in which the antenna is applied to the base by a printing operation.

As an alternative to this, it is provided that the base is made of a flexible material.

A flexible material of this kind could be, for example, a resiliently flexible material.

It is particularly advantageous, however, for introducing the information carrier unit with the base into the cable if the flexible material is a so-called pliant material.

With regard to the structure of the information carrier units, no further details have been specified so far.

An advantageous solution provides that the information carrier unit has at least one memory, for example for the information that can be read out.

Such a memory could be formed in a very wide variety of ways. For example, the memory could be formed such that the information stored in it can be overwritten by the read device.

However, a particularly advantageous solution provides that the memory has a memory area in which items of information once written are stored such that they are write-protected.

Such a memory area is suitable, for example, for storing an identification code for the information carrier unit or other data specific to this information carrier unit, which can no longer be changed by any of the users.

Such a memory area is also suitable, however, for the cable manufacturer to store information which is not to be overwritten. Such information is, for example, cable data, cable specifications or else details of the type of cable and how it can be used.

However, these data may, for example, also be supplemented by data comprising details about the manufacture of this specific cable or data representing the test records from final testing of the cable.

In addition, a memory according to the invention may also be formed furthermore in such a way that it has a memory area in which items of information are stored such that they are write-protected by an access code.

Such write-protected storage of information may, for example, comprise data which can be stored by a user. For example, after preparation of the cable, a user could store, in the memory area, data concerning the preparation of the cable or concerning the overall length of the cable or concerning the respective portions over the length of the cable, the user being provided, by the cable manufacturer, with an access code for this purpose, in order to store these data in the memory area.

A further advantageous embodiment provides that the memory has a memory area to which information can be freely written.

Such a memory area may, for example, receive information which is to be stored by the cable user in the cable, for example concerning the type of installation or the preparation of the same.

In particular when a number of information carrier units are used, it would be conceivable, for example, for it to be possible for all the information carrier units to be addressed with one access code. However, this has the disadvantage that the information carrier units consequently cannot be selectively used, for example to assign different information to specific portions of the cable.

One conceivable solution for assigning different information to different portions of the cable would be that each of the information carrier units bears a different length, so that, by reading out the length specified length of an information carrier unit, its distance from one of the ends of the cable or from both ends of the cable can be determined.

For this reason, it is advantageous if each of the information carrier units can be individually addressed by an access code.

In connection with the description so far of the information carrier units, it has just been assumed that they carry information which has been stored in the information carrier units by external read/write devices either before or during the production of the cable or during the use of the cable.

In order to be able to pass on information with the information carrier units, it is suitably provided in the case of an advantageous embodiment of the cable that the information carrier units receive and subsequently re-transmit information.

It is particularly advantageous in this respect if the information carrier units buffer-store the information, so that the transmission of the information can take place at an advantageous point in time.

A further advantageous solution for a cable according to the invention provides that the at least one information carrier unit of the cable picks up measured values of an associated sensor, that is to say that the information carrier unit not only stores and makes available external information but is itself capable of acquiring information about the cable, that is to say physical state variables of the cable.

For example, it is provided that the sensor picks up at least one of the state variables such as physical radiation, temperature, tension, pressure, elongation or moisture.

A particularly advantageous solution provides that shearing stresses in the cable can be picked up by the sensor.

With regard to the operation of the information carrier unit and the operation of the sensor by the information carrier unit, no further details have been specified so far. An advantageous solution provides that the information carrier unit reads out the sensor in the activated state.

This means that the information carrier unit has no power supply of its own, but has to be activated by an external energy supply.

One possibility for such activation is that the information carrier unit can be activated by a read/write device.

Another advantageous solution provides that the information carrier unit can be activated by an electromagnetic field of a current flowing through the cable.

An electromagnetic field of this kind can be achieved for example by a current flowing through the cable for supplying power to items of equipment, the current building up the electromagnetic field.

However, it is also conceivable to provide in the cable dedicated conductor strands which produce an electromagnetic field for supplying energy to the at least one information carrier unit or the multiplicity of information carrier units.

With regard to the storing of the measured values, it is advantageous if the information carrier unit stores the measured values in a memory area of the memory.

Since, if the cable has a long service life, a multitude of measured values can be expected, and they would consequently require a very large memory to store them, to reduce the amount of data, it is preferably provided that the information carrier unit only stores a measured value in the memory area if it exceeds a threshold value.

This may take place, for example, by the information carrier unit constantly picking up the measured values, but the information carrier unit being prescribed a threshold value as from which the measured values are stored, so that normal states are not stored but only the measured values which do not correspond to a normal state defined by the threshold value.

These measured values are then stored in the simplest case as nothing more than measured values, in somewhat more complex cases as measured values with an indication of the time at which they were picked up, or with an indication of other circumstances in which these measured values were picked up.

As an alternative to this, an advantageous solution provides that the information carrier unit only stores in the memory area, measured values which lie outside a statistically determined normal measured value distribution.

With regard to the regions in which the state variables are determined by means of the sensor, no further details have been specified so far.

One advantageous solution provides that the sensor picks up at least one state variable of the inner cable body.

Another solution provides that the sensor picks up at least one state variable of the cable sheath.

Another solution provides that the sensor picks up at least one state variable between the inner cable body and the cable sheath.

In the case of a further embodiment, it is provided that both a sensor for state variables of the inner cable body and a sensor for state variables of the cable sheath are provided.

With regard to the type of sensor and the way in which it is formed, no further details have been specified so far.

An advantageous exemplary embodiment provides that the sensor is a sensor which reacts irreversibly to the state variable to be picked up.

A sensor of this kind has the advantage that it reacts irreversibly when the state variable occurs, so that it is not necessary for the sensor, and in particular the information carrier unit, to be active at the point in time of the occurrence of the state variable to be picked up or the occurrence of the deviation in the state variable to be picked up. Rather, the sensor is capable at all later points in time of generating a measured value which corresponds to the state variable that was achieved at some point in time in the past.

As an alternative to this, it is provided that the sensor is a sensor which reacts reversibly with regard to the state variable to be picked up. In this case, it is necessary to activate the sensor when the state variable to be picked up occurs or when there is a change in the state variable to be picked up, in order to be able to pick up the measured value corresponding to this state variable.

In addition, the object mentioned at the beginning is also achieved by a method of communication between a read/write device and an information carrier unit which is disposed in a cable, between an outer surface of the cable and an inner cable body of the cable, it being provided according to the invention that the inner cable body has at least two electrical conductor strands running in the longitudinal direction of the cable, that an excitation of the two electrical conductor strands takes place by means of the read/write device and that the two electrical conductor strands are coupled with an antenna unit of the information carrier unit by means of parasitic electromagnetic fields.

With respect to further advantageous measures, reference is made to the corresponding explanations given above of the cable according to the invention.

Further features and advantages of the invention are the subject of the description and the pictorial representation of some exemplary embodiments.

DETAILED DESCRIPTION OF THE INVENTION

Figure 1:
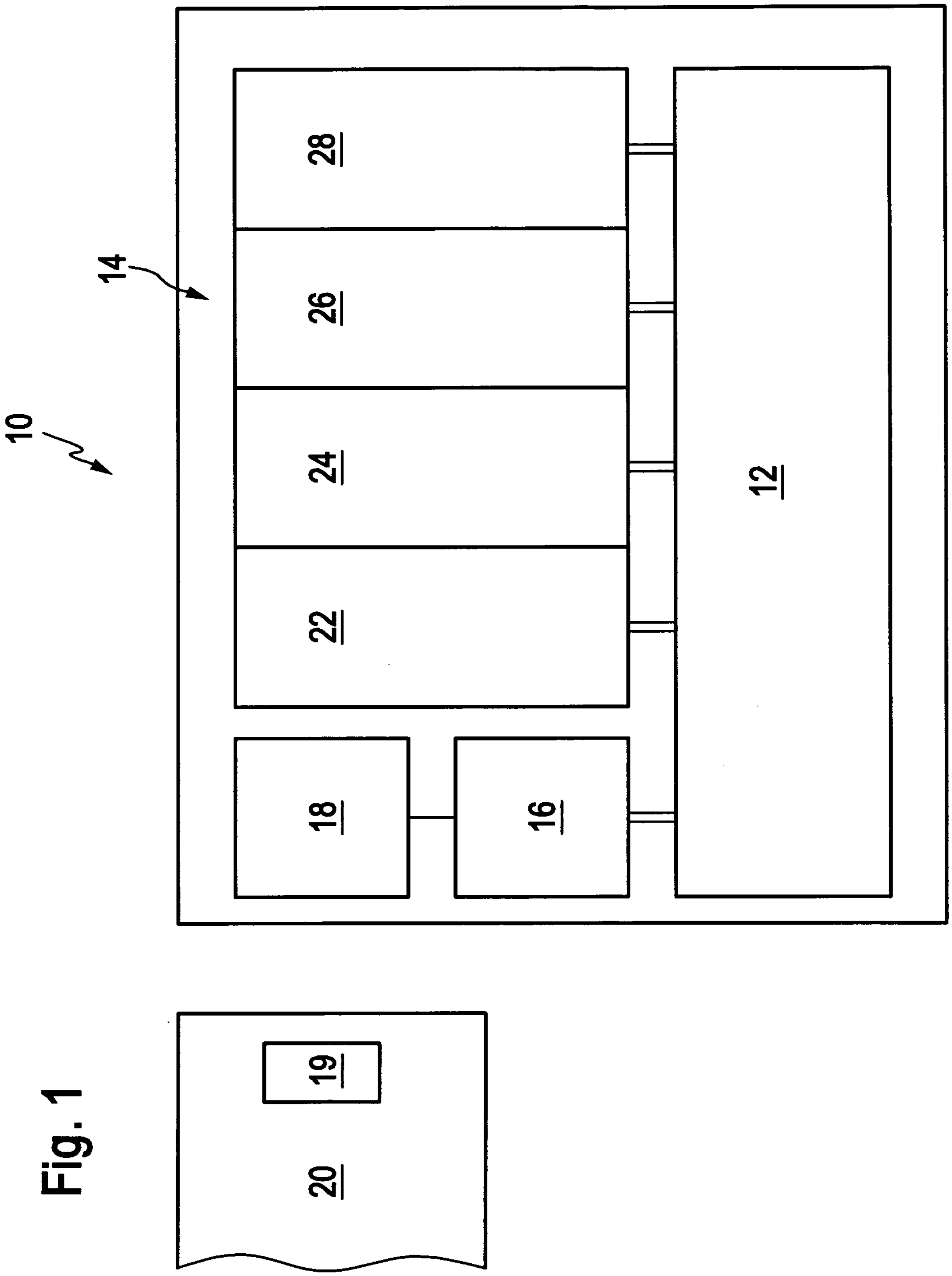
FIG. 1 shows a schematic block diagram of a first exemplary embodiment of an information carrier unit according to the invention.

A first exemplary embodiment of an information carrier unit 10 to be used according to the invention, represented in FIG. 1, comprises a processor 12, to which a memory designated as a whole by 14 is linked, the memory preferably being formed as an EEPROM.

Also connected to the processor 12 is an analog part 16, which interacts with an antenna unit 18.

When there is electromagnetic coupling of the antenna unit 18 to an antenna unit 19 of a read/write device designated as a whole by 20, the analog part 16 is then capable on the one hand of generating, with the required power, the electrical operating voltage that is necessary for the operation of the processor 12 and the memory 14, as well as the analog part 16 itself, and on the other hand of making available to the processor 12 the information signals transmitted by electromagnetic field coupling at a carrier frequency or transmitting information signals generated by the processor 12 by way of the antenna unit 18 to the read/write device 20.

In the case of the solution according to the invention, the antenna unit 18 operates in the UHF range as a dipole antenna, so that, when the power supply to the information carrier unit 10 does not take place by way of the read/write device 20, a great range in the communication with the read/write device 20 can be realized, for example up to 3 m, the interaction between the read/write device 20 and the antenna unit 18 taking place by way of electromagnetic fields. The carrier frequencies are from approximately 850 to approximately 950 MHz or from approximately 2 to approximately 3 GHz or from approximately 5 to approximately 6 GHz. When the power is supplied by the mobile read/write device 20, the communication range is up to 50 cm.

The antenna unit 18 operating in the UHF range may be formed as a dipole antenna of diverse configurations.

The memory 14 interacting with the processor 12 is preferably divided into a number of memory areas 22 to 28, which can be written to in various ways.

For example, the memory area 22 is provided as a memory area which can be written to by the manufacturer and, for example, carries an identification code for the information carrier unit 10. This identification code is written in the memory field 22 by the manufacturer, and at the same time the memory area 22 is write-protected.

The memory area 24 can, for example, be provided with write protection which can be activated by the cable manufacturer, so that the cable manufacturer has the possibility of writing to the memory area 24 and securing the information in the memory area 24 by write protection. In this way, the processor 12 has the possibility of reading and outputting the information present in the memory area 24, but the information in the memory area 24 can no longer be overwritten by third parties.

For example, the information stored in the memory area 24 may be information concerning the kind or type of cable and/or technical specifications of the cable.

In the memory area 26, information is stored, for example by the purchaser of the cable, and write-protected. Here there is the possibility for the purchaser and user of the cable to store information concerning the installation and use of the cable and secure it by write protection.

In the memory area 28, information can be freely written and freely read, so that this memory area can be used for storing and reading information during the use of the information carrier unit in conjunction with a cable.

The exemplary embodiment of the information carrier unit 10 represented in FIG. 1 as a block diagram is a so-called passive information carrier unit, and consequently does not require an energy store, in particular an accumulator or battery, in order to interact and exchange information with the read device 20.

Figure 2:
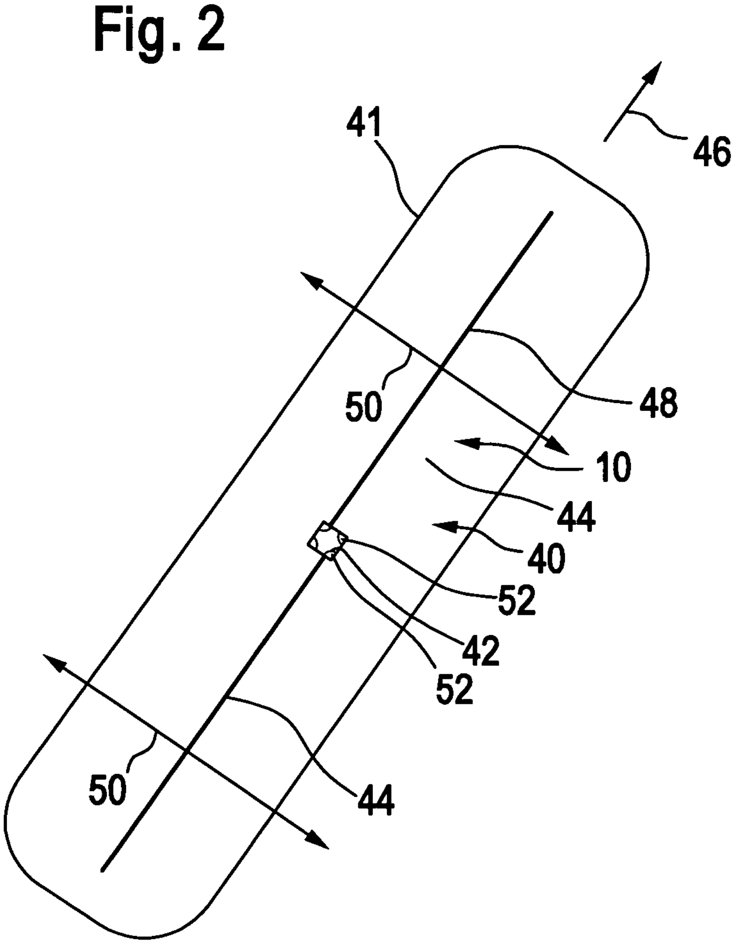
FIG. 2 shows a representation of how the first exemplary embodiment of the information carrier unit according to the invention is realized.

A way of realizing the first exemplary embodiment of the information carrier unit 10 according to the invention that is represented in FIG. 2 comprises a base 40, disposed on which is an integrated circuit 42, which has the processor 12, the memory 14 and the analog part 16, as well as conductor tracks 44, on the base 40, which form the antenna unit 18. The conductor tracks 44 may in this case be applied to the base 40 by means of any desired form-selective coating processes, for example in the form of printing-on a conductive lacquer or a conductive paste, or else be produced in the form of a wire loop or by an etching technique.

The antenna unit 18 represented in FIG. 2 is formed as a dipole antenna 48, which is elongate in a first direction 46 and has dipole radiation directions 50 which run transversely, in particular radially, to the first direction and in the direction of which an emission of an electromagnetic field primarily takes place.

If the information carrier unit 10 is for example of a great extent in the first direction 46, the base 40 is produced from a flexible material, in particular a pliant material, for example a plastic strip, to which material on the one hand the conductor track 44 can be easily and permanently applied and on the other hand, the integrated circuit 42 can also be easily fixed, in particular in such a way that a permanent electrical connection can be realized between outer connecting points 52 of the integrated circuit 42 and the conductor tracks 44, and which material is capable of adapting itself in its form in the cable to the cable components.

If the base 40 is formed as flat material, it is of advantage if it is formed with edge regions 41 with a blunt effect on their surroundings, in order to avoid damage to the surroundings of the base 40 in the cable during movement of the cable. This means in the case of a base 40 formed from a thin flat material that it has, for example, rounded corner regions and, if possible, also edges with a blunt effect, for example deburred edges.

Figure 4:
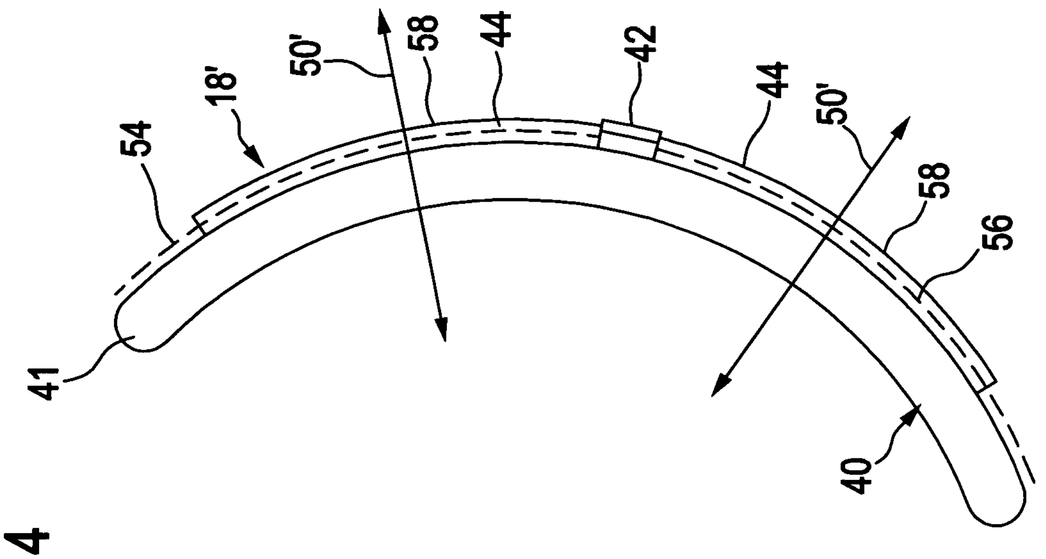
FIG. 4 shows a view of the second exemplary embodiment according to FIG. 3 in the direction of the arrow X in FIG. 3.
Figure 3:
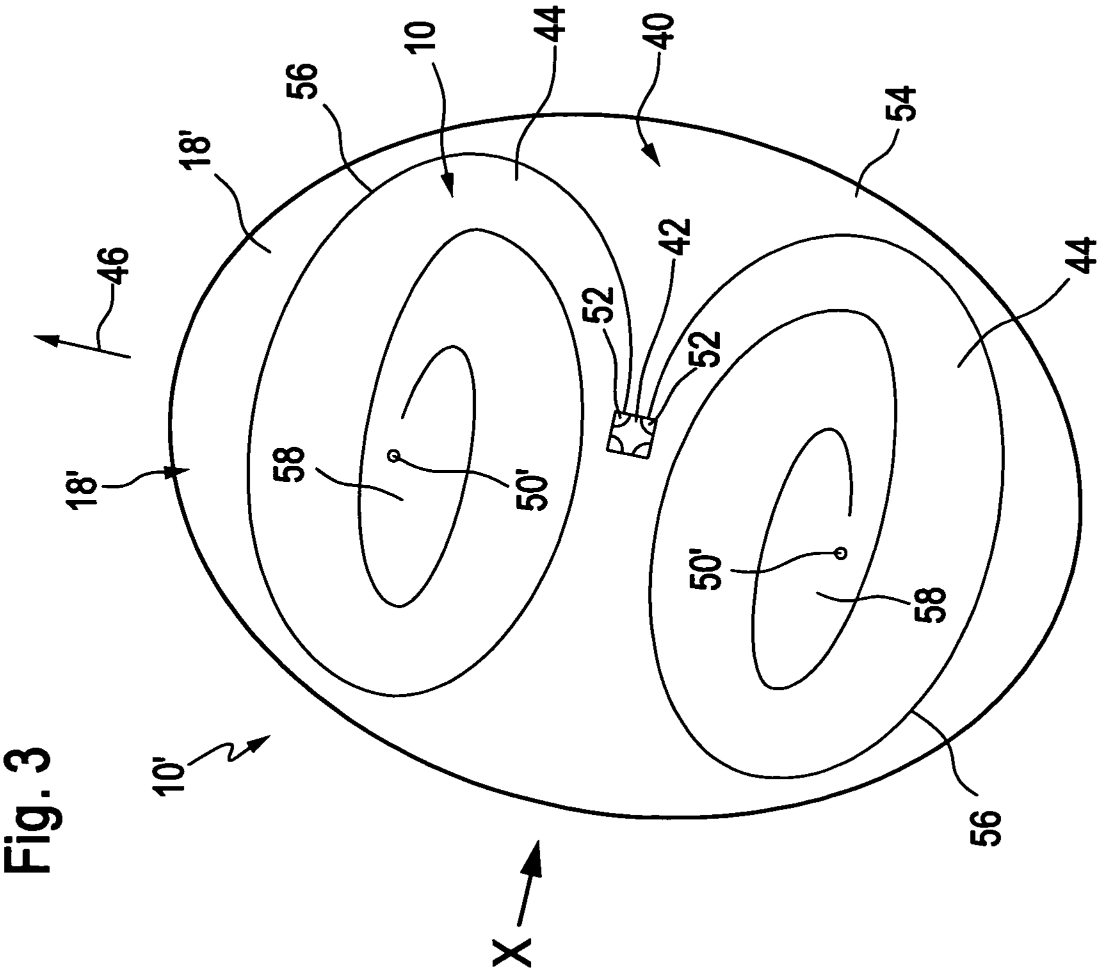
FIG. 3 shows a representation of how a second exemplary embodiment of the information carrier unit according to the invention is realized.

In the case of a second exemplary embodiment of the information carrier unit 10' according to the invention, represented in FIGS. 3 and 4, the antenna unit 18' has a folded dipole antenna 56, lying in a surface 54, the extent and shape of the surface 54 being determined by the extent and the shape of the base 40, which is adapted to the cable components.

The fact that the conductor track 44 forming the folded dipole antenna 56 runs in the surface 54 has the overall effect that the dipole antenna 56 has a dipole radiation direction 50' which primarily runs transversely, in particular perpendicularly, to the respective region 58 of the surface 54 in which it lies, so that there are two mutually opposed dipole radiation directions 50' present in every region 58 of the surface 54.

Otherwise, the second exemplary embodiment is provided with the same reference numerals with regard to the elements that are identical to the first exemplary embodiment, so that in this respect reference can be made to the statements made about the first exemplary embodiment in their entirety.

Figure 5:
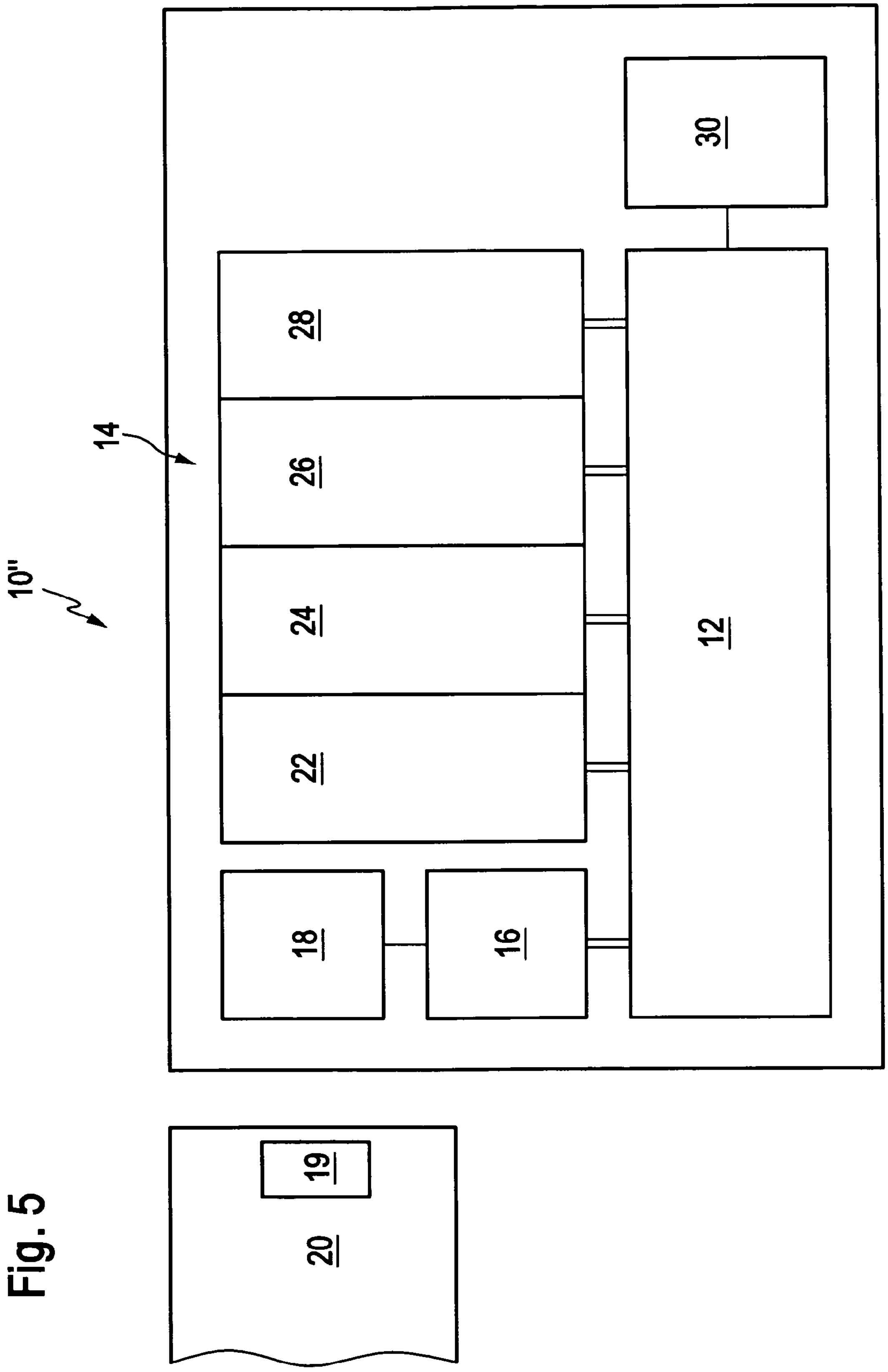
FIG. 5 shows a schematic block diagram of a third exemplary embodiment of an information carrier unit according to the invention.

In the case of a third exemplary embodiment of an information carrier unit 10" according to the invention, represented in FIG. 5, those elements that are identical to those of the first exemplary embodiment are provided with the same reference numerals, so that, with regard to the description of the same, reference can be made to the first exemplary embodiment in its entirety.

By contrast with the first exemplary embodiment, in the case of the third exemplary embodiment the processor 12 also has an associated sensor 30, enabling the processor 12 to pick up physical variables of the cable, such as for example radiation, temperature, pressure, tension, elongation or moisture, and for example store corresponding values in the memory area 28.

The sensor 30 may in this case be formed in accordance with the field of use.

For example, it is conceivable to form the sensor 30 as a pressure-sensitive layer, for measuring a pressure, it being possible for the pressure sensitivity to take place for example by way of a resistance measurement or, in the case of multiple layers, a capacitive measurement.

As an alternative to this, it is, for example, conceivable, for forming the sensor 30 as a temperature sensor, to form the sensor as a resistor that is variable with the temperature, so that a temperature measurement is possible by a resistance measurement.

If the sensor is formed as a tension or elongation sensor, the sensor 30 is formed, for example, as a strain gage, which changes its electrical resistance in accordance with elongation.

If, however, the sensor is formed as a sensor reacting irreversibly to a specific elongation or to a specific tension, it is likewise possible to form the sensor as a sensor breaking an electrical connection, for example as a wire or conductor track for which the electrical connection is interrupted as from a specific tension or of a specific elongation, by rupturing at a predetermined breaking point or by tearing, or goes over from a low resistance to a high resistance.

If appropriate, however, the tension measurement or the elongation measurement could also be realized by a capacitive measurement.

In the case of a moisture sensor, the sensor is preferably formed as a multilayer structure which changes its electrical resistance or its capacitance in accordance with moisture.

Otherwise, the second exemplary embodiment according to FIG. 5 operates in the same way as the first exemplary embodiment.

The sensor 30 is active whenever the information carrier unit 10 is activated by the read device 20, so that sufficient power is available to operate the sensor 30 also.

During the activation of the information carrier unit 10", the sensor 30 is consequently capable of transmitting measured values to the processor 12, which then stores these measured values for example in the memory area 28 and reads them out whenever they are requested by the read device 20.

Figure 6:
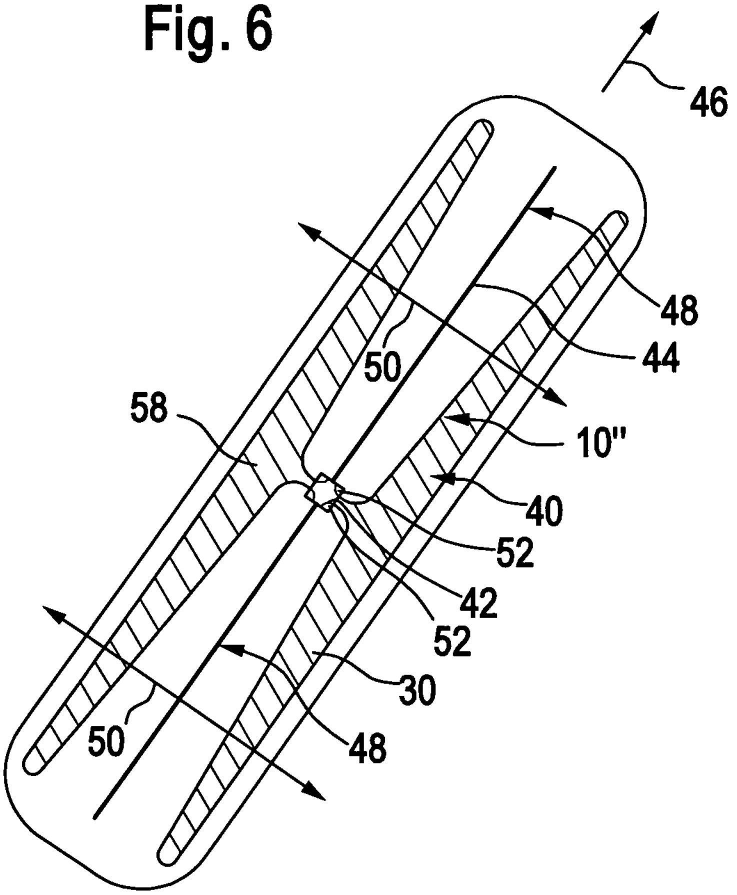
FIG. 6 shows a representation of how the third exemplary embodiment of the information carrier unit according to the invention is realized.

A way of realizing the second exemplary embodiment of the information carrier unit 10" according to the invention that is represented in FIG. 6 comprises the base 40, disposed on which is an integrated circuit 42, which has the processor 12, the memory 14 and the analog part 16, as well as conductor tracks 44 on the base 40, which form the dipole antennas 48 of the antenna unit 18. The conductor tracks 44 are applied to the base 40 by means of any desired [lacuna] in the form of etching a copper layer or printing-on a conductive lacquer or a conductive paste.

Also disposed on the base 40 is the sensor 30 in the form of a multilayer structure 58 disposed around the dipole antenna 48, which in the case of this embodiment is, for example, a space-saving capacitive moisture sensor, so that the sensor 30 may likewise be disposed either directly next to the integrated circuit 42 or be part of the integrated circuit 42.

On account of its state-dependent capacitance, the capacitive sensor 30 of the second exemplary embodiment may, as an alternative to the moisture sensor, also be formed as a temperature sensor or a pressure sensor.

Figure 7:
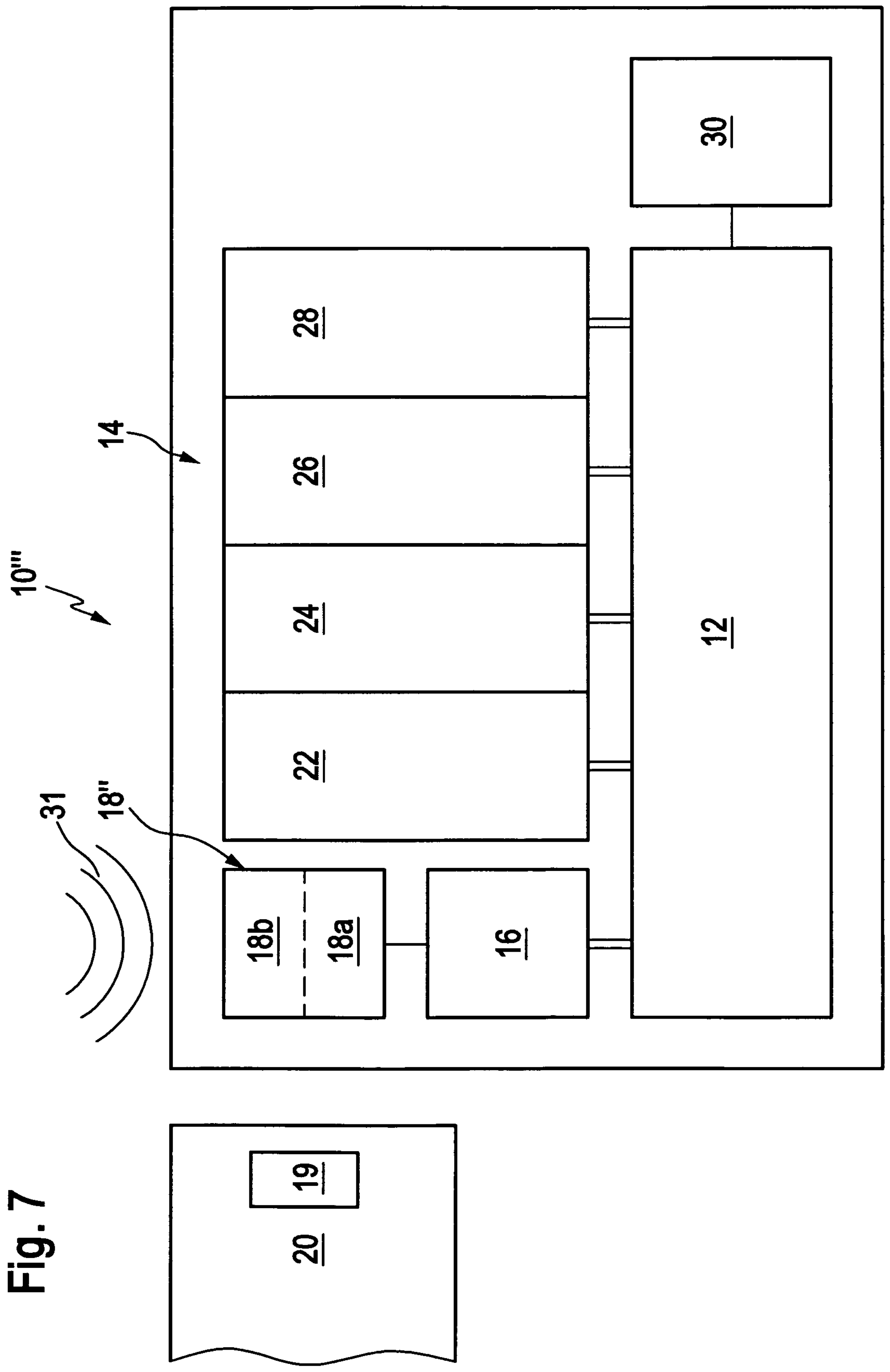
FIG. 7 shows a schematic block diagram of a fourth exemplary embodiment of the information carrier unit according to the invention.

By contrast with the previous exemplary embodiments, in the case of a fourth exemplary embodiment 10'", represented in FIG. 7, the analog part 16 has an associated antenna unit 18", which has a two-part effect, to be specific for example an antenna part **18*a*, which communicates in the usual way with the read device 20, and an antenna part 18*b*, which is capable of coupling to an alternating magnetic field 31 and drawing energy from it, in order to operate the information carrier unit 10 independently of the read device 20 with this energy drawn from the alternating magnetic field 31**.

For example, the alternating electromagnetic field 31 can be produced by the leakage field of an unshielded data line, an unshielded control line, a pulsed power line or an alternating current line which is connected, for example, to an AC voltage source with 50 Hz or a higher frequency. It is in this way possible to supply the information carrier unit 10" with energy as long as the alternating field 31 exists, irrespective of whether the read device 20 is intended to be used for writing or reading information.

The frequency of the alternating field 31 and a resonant frequency of the antenna part **18*b* can be made to match each other in such a way that the antenna part 18*b* is operated in resonance, and consequently allows optimum coupling-in of energy from the alternating field 31**.

Supplying the information carrier unit 10 with electrical energy in such a way, independently of the read device 20, is useful in particular if the sensor 30 is intended to be used over relatively long time periods for picking up a physical state variable which is not intended to coincide with the time period during which the read device 20 is coupled to the antenna unit **18*a*** but to be independent of it.

Consequently, for example, the information carrier unit 10 can be activated by switching on the alternating electromagnetic field 31, so that physical state variables can be measured on the part of the sensor 30 and picked up by way of the processor 12, and for example stored in the memory area 28, independently of the question as to whether or not the read device 20 is coupled with the antenna unit 18.

With an information carrier unit 10'" of this kind, there is the possibility of carrying out measurements with the sensor 30 over long time periods, so that also a multiplicity of measured values arise, which leads to a large amount of data if all the measured values are stored.

For this reason, a selection of the measured values is made by the processor 12 on the basis of at least one selection criterion in order to reduce the amount of data in the memory area 28.

One selection criterion is, for example, a threshold value, a measured value being stored if the threshold value is exceeded, so that in this way the amount of data is drastically reduced.

Another selection criterion may also be a statistical distribution, so that only measured values which deviate significantly from a previously determined statistical distribution are stored, and consequently the amount of data is also reduced as a result.

Figure 8:
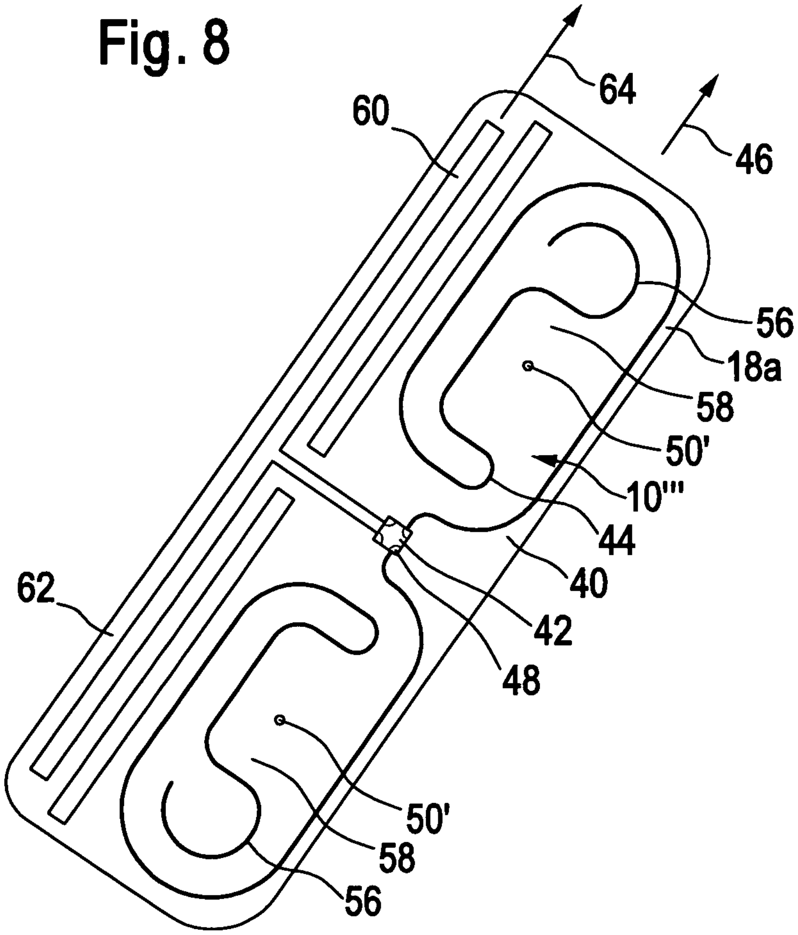
FIG. 8 shows a representation of how the fourth exemplary embodiment of the information carrier unit according to the invention is realized.

A way of realizing the third exemplary embodiment of the information carrier unit 10''' that is represented in FIG. 8 comprises a base 40, which is formed in the same way as in the case of the first exemplary embodiment.

Also disposed on the base 40 are the integrated circuit 42 and the conductor tracks 44, which, as in the case of the second exemplary embodiment according to FIGS. 3 and 4, in the case of this exemplary embodiment represent folded dipole antennas 56.

In the case of this exemplary embodiment, the sensor 30 is however formed as a strain gage 60, which in the case of this exemplary embodiment is disposed on a substrate 62 which is connected to the base 40 and can be elongated in a longitudinal direction 64 of the strain gage 60.

In the case of this exemplary embodiment, the longitudinal direction 64 runs parallel to the direction 46, which represents a longitudinal direction of the base 40.

Consequently, provided that the strain gage 60 is fixedly connected to a component part of the cable that can undergo elongation, in the case of this information carrier unit 10''' it is possible for elongations in the longitudinal direction 64 of the strain gage to be measured and to be picked up on the part of the processor 12 on the integrated circuit 42.

An information carrier unit corresponding to the exemplary embodiments described above can be used according to the invention in different variants for a cable.

Figure 9:
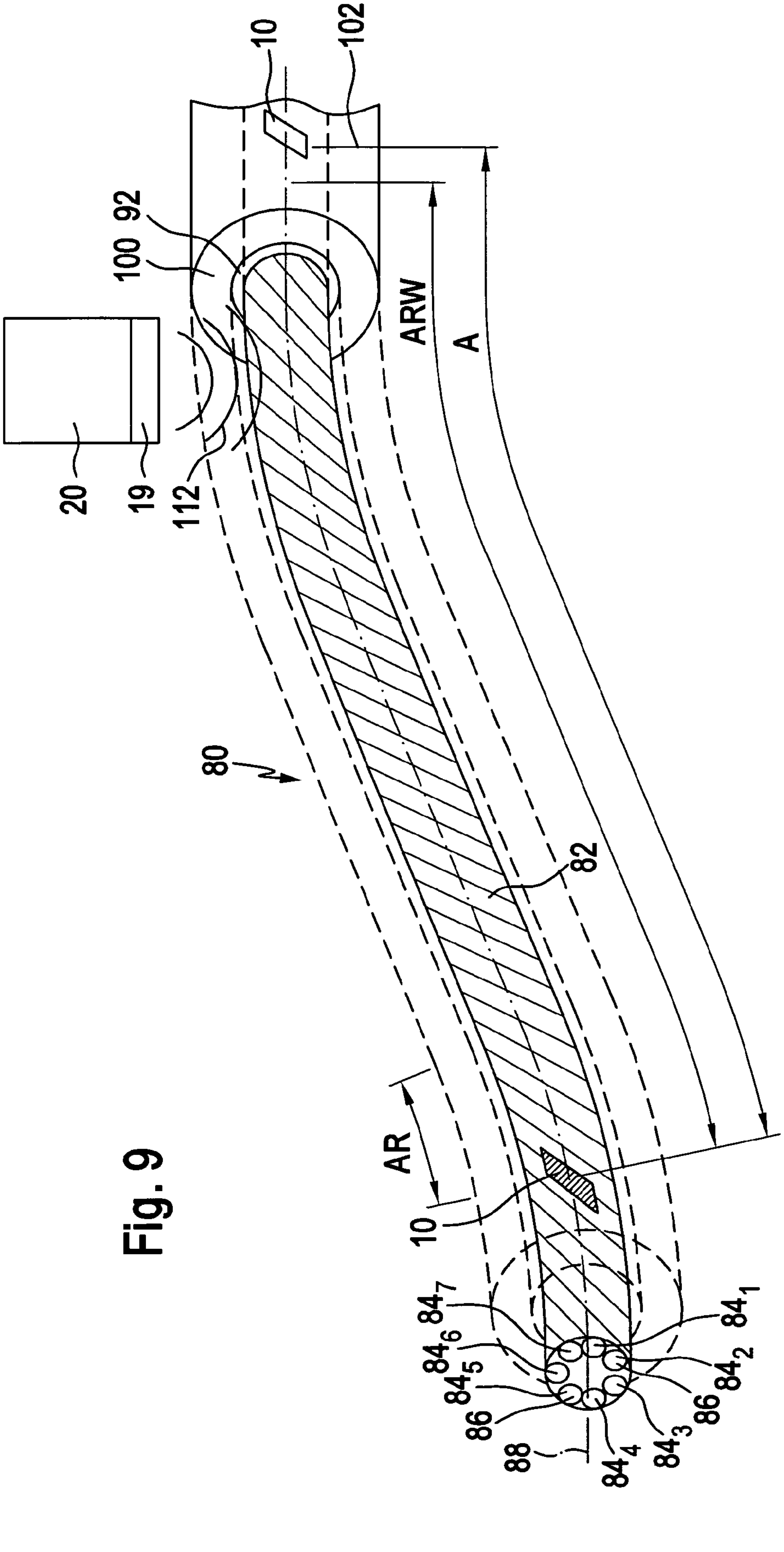
FIG. 9 shows a perspective representation of a piece of cable of a first exemplary embodiment of a cable according to the invention.

A first exemplary embodiment of a cable 80 according to the invention, represented in FIG. 9, comprises as a component of the cable an inner cable body 82, in which a number of electrical or optical conductor strands 84 run, the electrical conductor strands 84 respectively comprising, for example, an electrically conducting core 86 of an electrical conductor, which is insulated.

In this case, the electrical or optical conductor strands 84 are preferably twisted with one another about a longitudinal direction 88, that is to say they lie disposed about the longitudinal direction 88 of the cable 80 and run at an angle to a parallel to the longitudinal direction 88 that intersects the respective conductor strand 84.

The inner cable body 82 is enclosed over its entire extent in a longitudinal direction 88 of the cable 80 by a separating layer 92 for example, which represents a further component of the cable, separates the inner cable body 82 from a cable sheath 100 that represents a further component of the cable, encloses the inner cable body 82 and forms an outer surface 102 of the cable.

In the case of the exemplary embodiment of the cable 80 according to the invention that is represented in FIG. 9, an information carrier unit 10, for example according to the first exemplary embodiment, is disposed between the outer surface 102 of the cable and the inner cable body 82.

Figure 10:
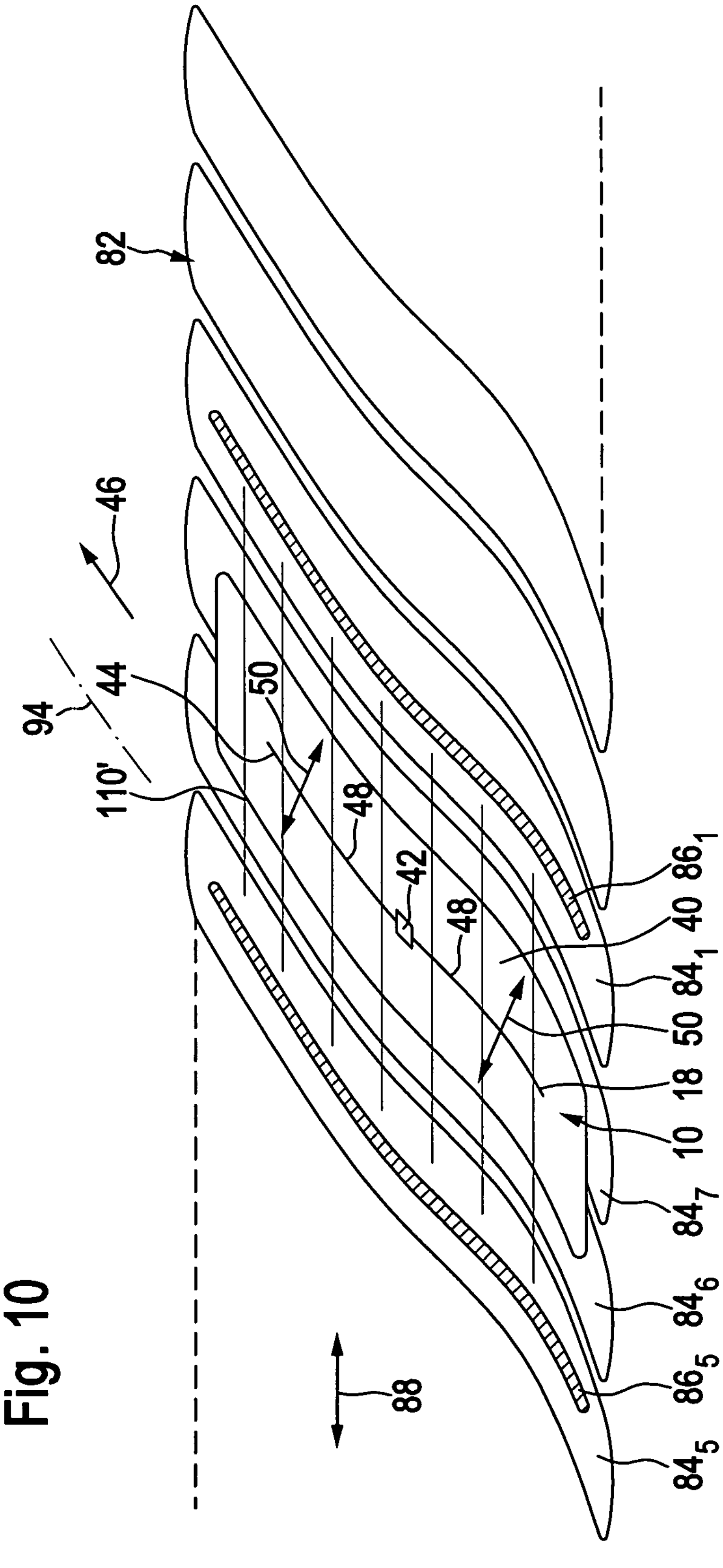
FIG. 10 shows an enlarged perspective representation, partially in section, of the first exemplary embodiment of the cable according to the invention.

As shown enlarged in FIG. 10, the information carrier unit 10 is aligned such that the first direction 46, along which the dipole antennas 48 extend, runs approximately parallel to a twisting direction 94, the extent of the base 40 in the first direction 46 corresponding to a fraction of a circumference of the inner cable body 82, for example less than one quarter of the same.

In the case of this alignment of the conductor track 44, one component of the dipole radiation direction 50 lies transversely to the twisting direction 94, preferably perpendicularly thereto, so that the antenna unit 18 formed as a dipole antenna 48 mainly emits wholly transversely to the first direction 46, and consequently also transversely to the longitudinal direction of the dipole antenna 48, or is mainly suitable for receiving electromagnetic radiation.

In the case of the inner cable body 82, some of the conductor strands 84 are, for example, formed as electrical conductor strands 84, for example the conductor strands $84_1$, $84_2$, $84_4$, $84_5$, and the other conductor strands, for example the conductor strands $84_3$ as well as $84_6$ and $84_7$, may be optical or electrical conductor strands, that is to say these conductor strands may, for example, respectively comprise a light guide or be formed as light guides.

If, for example, the cores $86_1$ and $86_5$ of the conductor strands $84_1$ and $84_5$ are galvanically isolated from one another, a parasitic coupling may take place between these cores $86_1$ and $86_5$ and the antenna unit 18 of the information carrier unit 10 by way of an electromagnetic field 110, which is created by the two cores $86_1$ and $86_5$ behaving in the manner of dipoles and consequently entering into interaction with the antenna unit 18 formed as a dipole antenna 48.

The frequency range in which an electromagnetic field of this kind forms is in this case preferably dictated by a resonant frequency range of the antenna unit 18, which however is made to match the resonant frequency range of the antenna unit 19 of the read/write device 20, while the two cores $86_1$ and $86_5$ of the conductor strands $84_1$ and $84_5$ are disposed and formed in such a way that they do not have any resonant frequency range or any shielding, in order to obtain good emission.

This coupling, caused by the parasitic electromagnetic field 110', between the antenna unit 18 of the information carrier unit 10 and the cores $86_1$ and $86_5$ of the conductor strands $84_1$ and $84_5$ and the antenna unit 19 of the read/write device 20 creates in the cable 80 according to the invention an effective antenna range ARW which is a multiple of, at least approximately twice, still better more than approximately 10 times, an antenna range AW between the antenna unit 18 and the antenna unit 19 if the antenna unit 18 is disposed in such a way that it is free from any interaction, that is to say without any influencing by its surroundings.

In this case, the antenna range is understood as meaning the range of an antenna unit 18 in which it is still possible with a defined antenna field strength to transmit information in the longitudinal direction of the cable. The antenna range consequently corresponds to the reading/writing range of the antenna unit 18 in the longitudinal direction of the cable.

There is consequently the possibility of disposing the antenna unit 19 of the read/write device 20 in relation to the information carrier unit 10 in such a way that the distance in the longitudinal direction 88 of the cable corresponds at most to the effective antenna range ARW, whereby a coupling between the antenna unit 19 of the read/write device 20 and the antenna unit 18 of the information carrier unit 10 in the longitudinal direction 88 of the cable takes place within the distance ARW.

This increased effective antenna range ARW on the basis of the coupling by way of parasitic electromagnetic fields 110' between the antenna unit 18 and the conductor strands $84_1$ and $84_5$ makes it possible for example, as represented in FIG. 9, to use electromagnetic field coupling with the antenna unit 19 of the read/write device 20 for coupling to the conductor strands $84_1$ and $84_5$ by way of an electromagnetic field 110', in order to excite said strands, and consequently to use the conductor strands $84_1$ and $84_5$, which can be coupled to the antenna unit 18 of the information carrier unit 10 by way of the parasitic electromagnetic field 110', for establishing a coupling between the antenna unit 19 of the read/write device 20 and the antenna unit 18 of the information carrier unit 10 over a distance which reaches as far as the effective antenna range ARW, although the actual antenna range AR that is uninfluenced by the surroundings is a fraction of the antenna range ARW, so that, by way of electromagnetic fields, a coupling of the read/write device 20 and the information carrier unit 10 can be established at points of the cable 80 that is not possible without the parasitic electromagnetic field.

Consequently, one and the same information carrier unit 10 can be coupled to the respective read/write device 20 within twice the effective antenna range ARW.

There is consequently the possibility, for example, even without approximate knowledge of the position of the information carrier unit 10 in the longitudinal direction 88 of the cable 80, of reading out information from said unit, for example concerning the type and specification of the cable, or of writing in information.

Consequently, if it is intended for information to be available from one of the information carrier units 10 over the entire length of the cable 80, it is possible by means of the parasitic electromagnetic fields and the possible coupling of the antenna units 18, 19 to reduce the number of information carrier units 10 necessary in comparison with a cable 80 without parasitic electromagnetic fields 110'.

Figure 11:
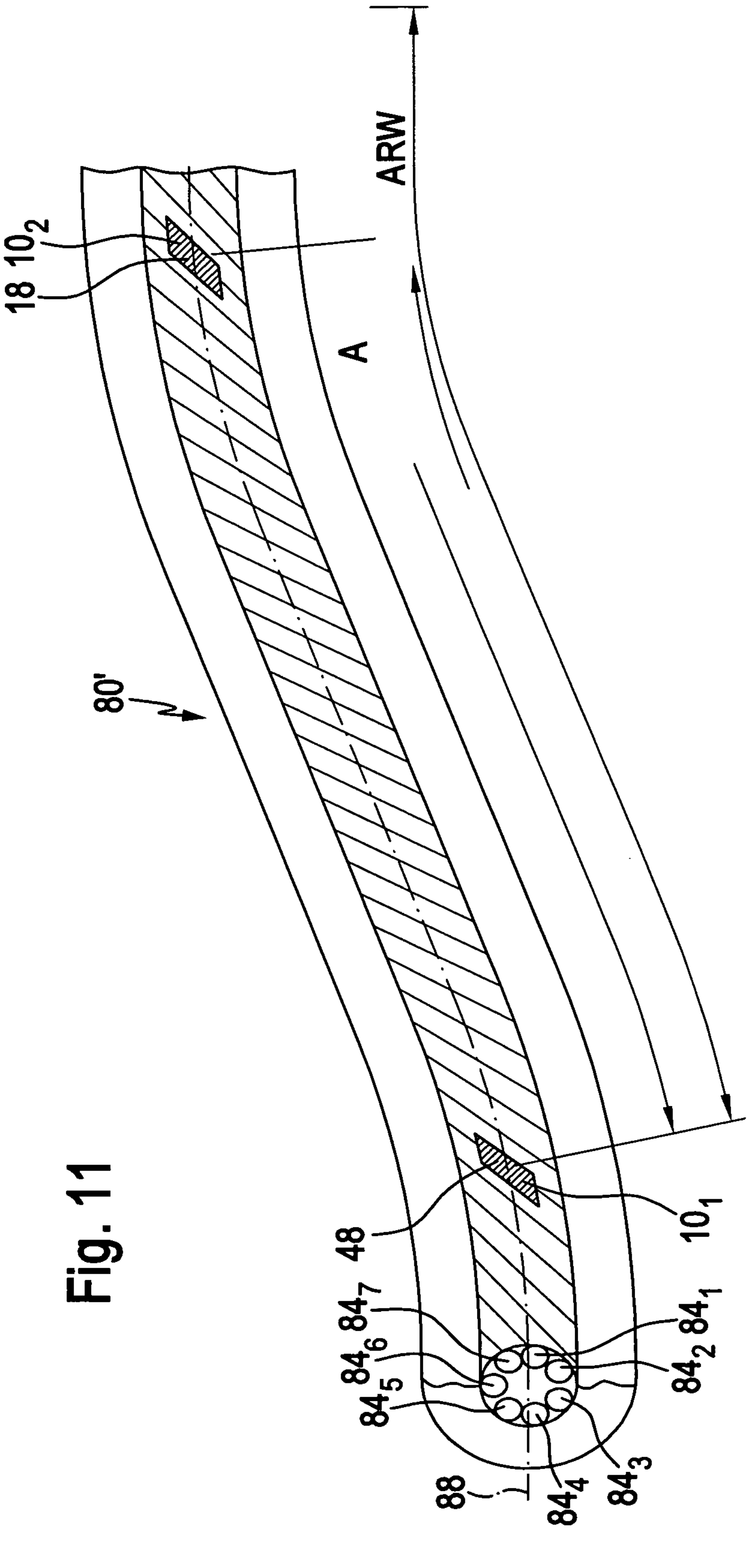
FIG. 11 shows a perspective representation similar to FIG. 9 of a second exemplary embodiment of the cable according to the invention.

In the case of a second exemplary embodiment of the cable 80' according to the invention, represented in FIG. 11, the information carrier units 10 are disposed following one another in the longitudinal direction 88 at defined distances A, for example constant spacings A.

If the distance A is less than or equal to the effective antenna range ARW of the antenna units 18 of the information carrier units 10, there is the possibility of coupling the antenna units 18 of the information carrier units 10 with the conductor strands $84_1$ and $84_4$ by way of the parasitic coupling, and consequently the possibility of transmitting information from one $18_1$ of the antenna units 18 to the other $18_2$ of the antenna units 18.

In this case, for example with an information carrier unit 10 according to FIG. 1, the memory area 28 is provided for buffer-storing received information in the information carrier unit 10 and for making it available again for passing on the information.

In this case, a protocol for the information transmission should be set up by the information carrier units 10 in such a way that the respective information carrier unit 10 is capable to know whether the information is intended for this information carrier unit 10 or for another.

Depending on how this information is structured, the processor 12 is capable of deciding whether the information is intended for this information carrier unit 10, and is consequently to be stored and correspondingly processed, or whether it is information that is merely to be buffer-stored and passed on, without the information carrier unit 10 itself processing the information and, for example, sending out information of its own on the basis of a request.

With the information carrier units 10 disposed in this way in a cable 80' according to the invention there is the possibility, depending on the quality of the coupling between the information carrier units 10 by way of parasitic electromagnetic fields 110, of coupling not only two directly neighboring information carrier units 10, for example the information carrier units $10_1$ and $10_2$, to each other, but a whole series of information carrier units 10 disposed following one after the other in the longitudinal direction 88 of the cable 80, each of the information carrier units 10 buffer-storing information that is not intended for it in the memory area 28 and subsequently re-transmitting it.

In the case of passive information carrier units 10, it is for example provided in this respect that the energy resulting from electromagnetic fields parasitically or non-parasitically coupled to the antenna unit 18 is first used to charge the unit's own energy store and then, when its energy store has a sufficient charging state, to re-transmit the information buffer-stored in the memory area 28 or else transmit information of its own that is stored in one of the memory areas.

However, there is also the possibility, as described in connection with the third exemplary embodiment of an information carrier unit 10" according to the invention, of transmitting energy to the respective information carrier unit 10" by way of the stray field of further conductor strands, for example the conductor strands $84_2$ and $84_4$, so that the information carrier units 10 are constantly supplied with energy, and consequently are capable independently of the energy supply of storing information coupled-in by way of the parasitic electromagnetic fields and, if appropriate, themselves once again transmitting said information with the necessary transmitting power.

In particular, there is the possibility of creating over the length or part of the length of the cable 80', an information carrier network which, by interposing one or more information carrier units 10, allows information to be exchanged between individual information carrier units 10 in the longitudinal direction 88 of the cable 80' and the read/write device 20.

Figure 12:
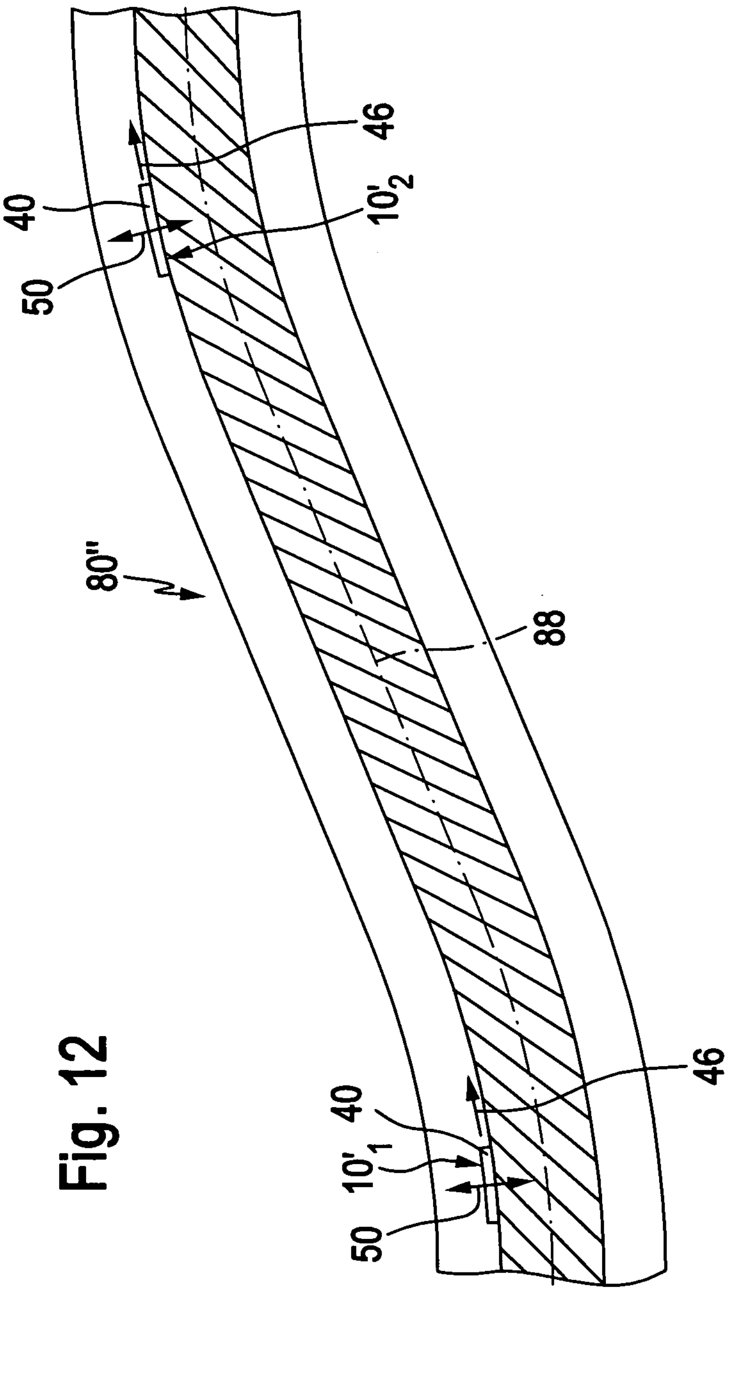
FIG. 12 shows a perspective representation similar to FIG. 9 of a third exemplary embodiment of the cable according to the invention.

In the case of a third exemplary embodiment of a cable 80" according to the invention, represented in FIG. 12, by contrast with the first and second exemplary embodiments, the information carrier units 10 are aligned according to the second or fourth exemplary embodiment such that their first direction 46 runs approximately parallel to the longitudinal direction 88 of the cable 80", while the dipole radiation direction 50 is directed transversely to the longitudinal direction 88 of the cable 80" toward the inner cable body 82.

In this case, too, coupling by way of a parasitic electromagnetic field 110 with at least two conductor strands 84 of the inner cable body 82 is possible, so that the couplings already described in connection with the first and second exemplary embodiments can likewise be realized, it being possible to assume that the effective antenna range ARW is reduced somewhat in comparison with the first and second exemplary embodiments.

Figure 13:
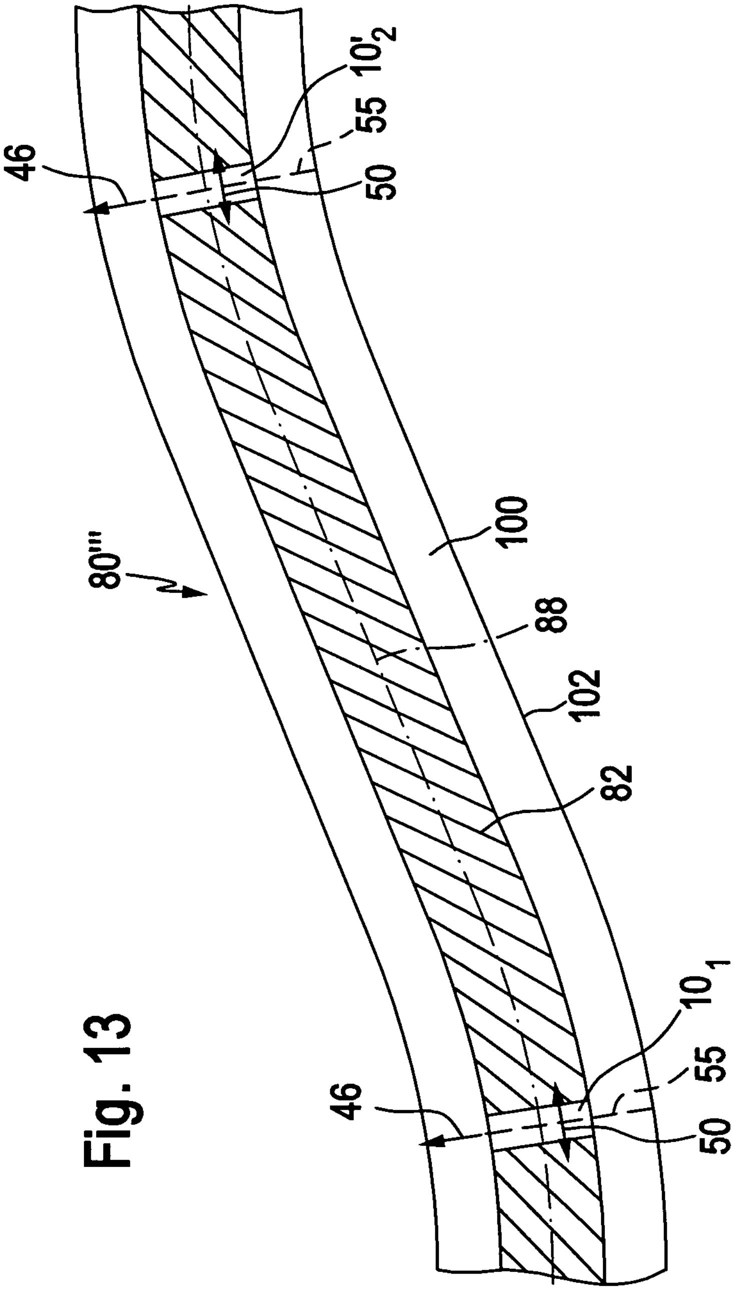
FIG. 13 shows a perspective representation similar to FIG. 9 of a fourth exemplary embodiment of the cable according to the invention and FIG. 14 shows a perspective representation similar to FIG. 9 of a fifth exemplary embodiment of the cable according to the invention.

In the case of a fourth exemplary embodiment of a cable 80"' according to the invention, represented in FIG. 13, by contrast with the previous exemplary embodiments, the information carrier units 10 are aligned in such a way that their first directions 46 run transversely to the longitudinal direction 88 of the cable 80"'. The base 40 of the information carrier units 10 is, in particular, wound around the inner cable body 82, so that the dipole antenna 48 also lies in a surface 55 running transversely to the longitudinal direction 88 of the cable, and consequently, by being installed in the cable 80"', behaves in a way corresponding to a folded dipole antenna and has a main dipole radiation direction 50" which runs approximately in the longitudinal direction 88 of the cable 80"'. Also in the case of this exemplary embodiment, a coupling by way of parasitic electromagnetic fields takes place, over for example, the conductor strands $84_1$ and $84_5$, as described in connection with the previous exemplary embodiments, but if appropriate with a somewhat reduced effect, so that overall the effective antenna range ARW is also reduced.

Figure 14:
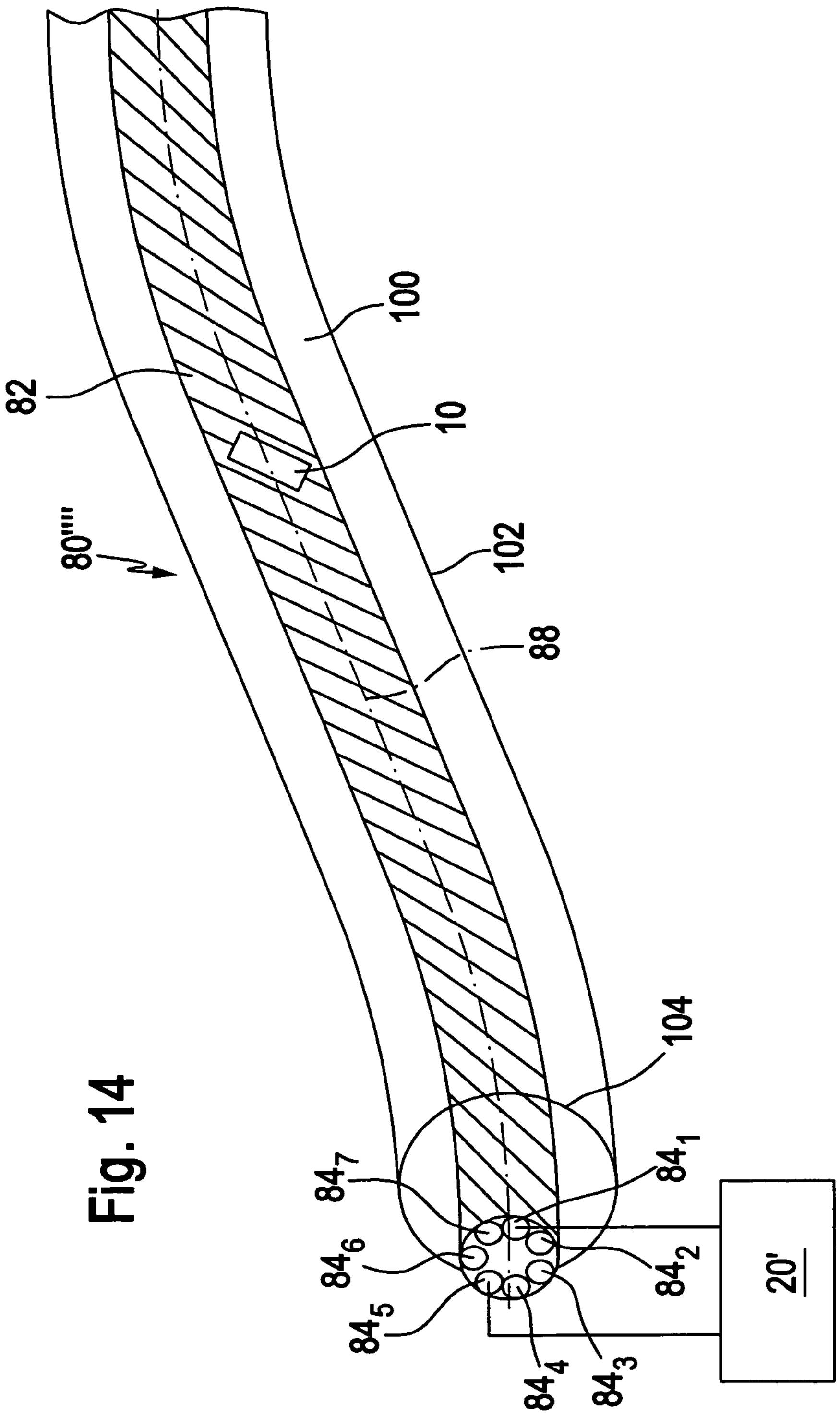

In the case of a fifth exemplary embodiment of a cable 80"" according to the invention, represented in FIG. 14, an excitation of the conductor strands $84_1$ and $84_5$ takes place by galvanic coupling of the same with a read/write device 20', which is formed without an antenna unit but is galvanically coupled directly with the conductor strands $84_1$ and $84_5$, and as a result couples high frequency into these conductor strands $84_1$ and $84_5$, which act in the manner of antennas in the inner cable body 82, and consequently in the cable 80"", this high frequency lying in a frequency range in which the conductor strands $84_1$ and $84_5$ do not resonantly interact and do not have any shielding, so that, on the basis of this condition, emission of a parasitic electromagnetic field, in particular a dipole-like electromagnetic field, takes place, allowing coupling of one of the antenna units 18 of an information carrier unit 10 in the cable 80"" by way of the parasitic electromagnetic field.

Depending on how far in the longitudinal direction 88 of the cable, the conductor strands $84_1$ and $84_5$ that are mismatched with regard to their resonance to the high frequency of the read/write device 20' in the cable 80"", produce the parasitic electromagnetic field for coupling with the antenna units 18, there is the possibility, with the direct assistance of the conductor strands $84_1$ and $84_5$, of addressing not only one information carrier unit 10 in the cable 80"" but a number of information carrier units 10 that are disposed nearest the end 104 at which the galvanic coupling of the conductor strands $84_1$ and $84_5$ with the read/write device 20' takes place.

In the most advantageous case, galvanic coupling of the conductor strands $84_1$ and $84_5$ to the read/write device even provides the possibility of addressing all the information carrier units 10 disposed in the cable 80"" over substantially the entire length thereof, transmitting information to them or reading out information from them, so that an information carrier network with the possibilities described in connection with an information carrier unit 10 is available.

As an alternative to galvanic coupling, the excitation of the conductor strands $84_1$ and $84_5$ at the end 104 of the cable 80"" may also take place by using a suitable antenna unit 19 of the read/write unit 20' that is disposed at this end 104 for coupling-in, so that coupling by way of parasitic electromagnetic fields 110, as described above, then takes place with the antenna units 18 of the information carrier units 10.

The invention claimed is:

1. Cable, comprising:

an inner cable body, in which electrical conductor strands run in a longitudinal direction of the cable, a cable sheath, enclosing the inner cable body and lying between an outer surface of the cable and the inner cable body, and at least one information carrier unit, disposed within the outer surface of the cable, the information carrier unit comprising a substantially flat base made of a flexible material and a conductor acting as a coreless antenna unit disposed on the base, which antenna unit can be coupled with a read/write device by parasitic electromagnetic fields between the antenna unit and at least two of the electrical conductor strands of the inner cable body.

2. Cable according to claim 1, wherein, when excited by the read/write device, the at least two electrical conductor strands build up and emit the parasitic electromagnetic field in a frequency range predetermined by the antenna unit of the information carrier unit.

3. Cable according to claim 1, wherein the at least two electrical conductor strands interact non-resonantly in a frequency range of the parasitic electromagnetic field.

4. Cable according to claim 1, wherein the at least two electrical conductor strands behave in a manner of a dipole and the antenna unit can be coupled with the electrical conductor strands by the parasitic electromagnetic fields thereby forming.

5. Cable according to claim 1, wherein the at least two electrical conductor strands of the inner cable body are galvanically isolated from one another.

6. Cable according to claim 1, wherein the at least two electrical conductor strands are twisted with at least one of an optical conductor strand and one further electrical conductor strand.

7. Cable according to claim 1, wherein the antenna unit of the information carrier unit is formed as a dipole antenna with a dipole radiation direction.

8. Cable according to claim 1, wherein a multiplicity of information carrier units are disposed in the longitudinal direction of the cable, the information carrier units being disposed at a distance from one another.

9. Cable according to claim 8, wherein the respective antenna units of the information carrier units can be coupled by way of parasitic electromagnetic fields over the at least two electrical conductor strands.

10. Cable according to claim 9, wherein, by the parasitic electromagnetic fields between the respective antenna units of the information carrier units and the at least two conductor strands, an antenna range of each of the antenna units that is increased by a factor of more than two in comparison with an antenna range of an antenna unit that is uninfluenced by the parasitic electromagnetic fields, is obtained in the longitudinal direction of the cable.

11. Cable, comprising:

an inner cable body, in which electrical conductor strands run in a longitudinal direction of the cable, a cable sheath, enclosing the inner cable body and lying between an outer surface of the cable and the inner cable body, a multiplicity of information carrier units, disposed within the outer surface of the cable, said information carrier units being disposed in the longitudinal direction of the cable at a distance from one another, and an antenna unit of one of the information carrier units adapted to be coupled with the antenna unit of another of the information carrier units by electromagnetic field coupling;

the antenna units of the information carrier units being adapted to be coupled by way of parasitic electromagnetic fields over the at least two electrical conductor strands;

by the parasitic electromagnetic fields between one of the antenna units of the information carrier units and the at least two conductor strands, an antenna range of the antenna unit of the information carrier that is increased by a factor of more than two in comparison with an antenna range of an antenna unit that is uninfluenced by the parasitic electromagnetic fields, being obtained in the longitudinal direction of the cable; and the information carrier units being disposed at defined regular intervals in relation to one another in such a way that the distances between the information carrier units correspond to at least 2.5 times an effective antenna range of the information carrier units in a direction of the respectively nearest information carrier units.

12. Cable according to claim 11, wherein antenna units respectively following one another in the longitudinal direction of the cable can be coupled with one another.

13. Cable according to claim 11, wherein each of the information carrier units can be individually addressed.

14. Cable according to claim 11, wherein each of the information carrier units can be individually addressed by an access code.

15. Cable according to claim 11, wherein the information carrier units are formed in such a way that they receive and subsequently re-transmit information.

16. Cable according to claim 15, wherein the information carrier units buffer-store the information.

17. Method of communication between a read/write device and an information carrier unit which is disposed in a cable, the information carrier unit being disposed between an outer surface of the cable and an inner cable body of the cable, the inner cable body having at least two electrical conductor strands running in the longitudinal direction of the cable, the method comprising:

exciting of the two electrical conductor strands by means of the read/write device, coupling the two electrical conductor strands with a coreless antenna unit disposed on a flat base of the information carrier unit by means of parasitic electromagnetic fields, and transferring an information signal between the information carrier and the read write device via the electromagnetic fields.

18. Cable according to claim 1, wherein the flexible material is a pliant material.

* * * * *